July 2, 1929.  H. A. WEIDENBACH  1,719,411

UNIVERSAL JOINT

Filed Nov. 17, 1926

INVENTOR
Herman A. Weidenbach
By Jas. M. Ellis
ATTORNEY

Patented July 2, 1929.

1,719,411

UNITED STATES PATENT OFFICE.

HERMAN A. WEIDENBACH, OF BUFFALO, NEW YORK.

UNIVERSAL JOINT.

Application filed November 17, 1926. Serial No. 148,948.

My invention relates in general to universal joints, and in particular to a universal shaft coupling.

The principal object of my invention has been to provide a device of this nature which shall have the parts thereof flexibly connected, but which shall provide a positive drive between parts of the device.

Another object has been to provide a device having a plurality of helical connecting springs.

Moreover, I provide durable means for connecting the springs to the parts of the device.

Furthermore, my device has means for keeping the axes of the two parts thereof in intersection.

The above objects and advantages have been accomplished by the device shown in the accompanying drawings, of which:

Figure 1:
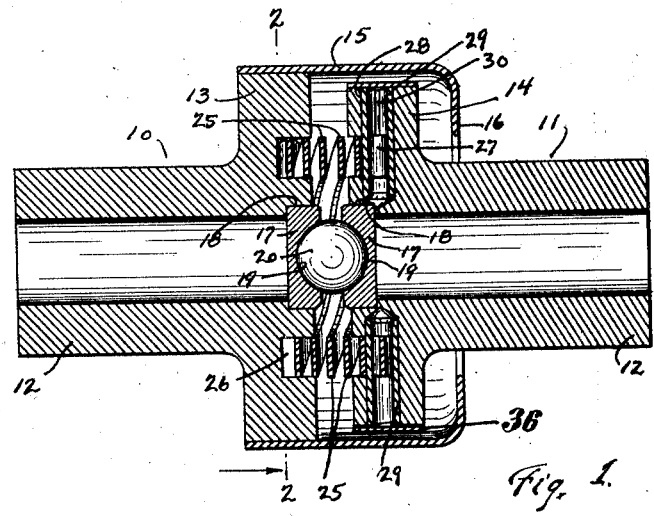
Fig. 1 is a longitudinal, sectional view of my complete device.

My device comprises two coupling members 10 and 11, each provided with a hub portion 12 for suitably connecting the coupling members 10 and 11 to the shafts which are to be connected together. The coupling member 10 is provided with a flange 13, and the coupling member 11 is provided with a flange 14. The flange 13 is somewhat larger than the flange 14, and it carries a casing 15 which extends toward the coupling member 11, and is provided with an inwardly extending flange 16, whereby the flange 14 of the coupling member 11 and the working parts of the device are enclosed and protected. The customary leather boot (not shown) may be used if desired to connect the flange 16 of the casing 15 with the coupling member 11, whereby the interior of the casing will be sealed against the accumulation of dust and dirt.

Arranged at the center of each of the flanges 13 and 14 of the coupling members is a bearing seat 17. Each bearing seat is preferably set into the face of the flange by engaging a recess 18 formed therein. These bearing seats are preferably of hardened or tempered steel and are provided on their adjacent faces with spherical recesses 19 for engagement with a steel ball 20. It will be seen that since the center of the ball 20 is arranged at the intersection of the axes of the two coupling members 10 and 11, these two members will always be kept in a position where their axes will intersect.

Figures 3, 4, 5:
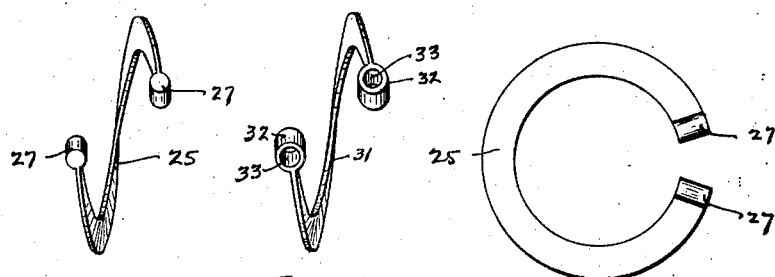
Fig. 3 is a face view of one of the helical springs used in my device.
Fig. 4 is a side view of one of the springs.
Fig. 5 is a side view of a modified form of spring.
Figure 2:
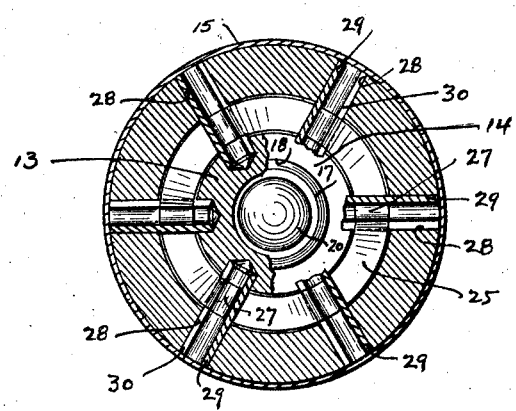
Fig. 2 is a fragmentary, transverse, sectional view taken on line 2—2 of Fig. 1.
Figure 6:
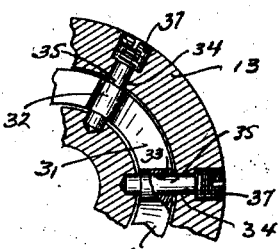
Fig. 6 is a fragmentary, sectional view showing the method of fastening the spring of Fig. 5.

Connecting the coupling members are a plurality of helical springs 25. Part of each spring near each of its ends is disposed within an annular recess 26 formed in the face of each of the flanges 13 and 14 of the coupling members. Each of the springs is preferably of a length sufficient to nearly complete a circle and each is bent in a helical manner, as shown in Fig. 4. At each end of each of the springs there is formed a cylindrical portion 27. When viewed from the side of the spring as in Fig. 3, the axis of each of these cylindrical portions is radial, while when viewed from the end as shown in Fig. 4, the axes lie preferably in parallel planes.

Each of the flanges 13 and 14 of the coupling members is provided with a plurality of radially arranged holes 28, equal in number to the number of springs employed. These holes extend into the recesses 26 formed in the flanges 13 and 14. In each of the holes is disposed a sleeve 29. Each sleeve has an inside diameter substantially the same as the cylindrical portions of the springs, and a longitudinal slot 30 is formed in each of the sleeves which passes over the body portion of the spring. It will thus be seen that each of the springs is pivotally connected to the coupling members by the engagement of the cylindrical portions 27 thereof with the sleeves.

The modified spring 31 of Fig. 5 is provided with a cylindrical portion 32 at each end, and each portion is formed with a longitudinal bore 33. Each coupling member is provided with a plurality of radial holes 34 with each of which a pin 35 is engageable. An enlarged, screw-threaded portion 37 is formed on each pin for engagement with suitable screw-threads formed in the coupling members, whereby the pin will be held in place. When assembling the device, one of the pins is engageable with each of the bores 33 of the springs and the spring ends are thereby pivotally retained. If desired, straight pins (not shown) may be used instead of the pins 35 with their screw-threaded portions.

It will be obvious from the foregoing that when the coupling members are connected to shafts which have their axes at an angle, the springs will flex so as to compensate for the annular movement of the shafts while at the same time providing a positive drive from one of the coupling members to the other.

Since the springs are pivotally connected to the coupling members, the friction of the device and breakage of the springs is reduced to a minimum. While I have shown six helical springs, it is obvious that the number of springs employed is dependent upon the amount of power transmitted and the size of the flanges of the coupling members.

Any suitable means may be employed to keep the sleeves 29 in place, as, for instance, the casing 15 and a ring 36 carried by the flanges 13 and 14, respectively. When straight pins are used instead of the screw-threaded pins 35, they may be held in place by such rings.

Obviously, some modifications of the details herein shown and described may be made without departing from the spirit of my invention, or the scope of the appended claims, and I do not, therefore, wish to be limited to the exact embodiment herein shown and described, the form shown being merely a preferred embodiment thereof.

Having thus described my invention, what I claim is:

1. A universal coupling comprising two coupling members, means for keeping the axes of the members in intersection, and a plurality of springs each pivotally secured at each end to each of the members for connecting the members, each spring being in the form of an open, helically-shaped ring.

2. A universal coupling comprising two coupling members, means for keeping the axes of the members in intersection, a plurality of springs, each spring being in the form of an open, helically-shaped ring and having a cylindrical portion at each end thereof, the cylindrical portions having their axes arranged substantially radial, and means for pivotally connecting the cylindrical portions of the springs to the members.

3. A universal coupling comprising two coupling members, means for keeping the axes of the members in intersection, a plurality of springs, each spring having a cylindrical portion at each end thereof, and a plurality of sleeves carried by the members, one for each end of each spring, the sleeves being pivotally engageable with the cylindrical portions of the springs.

4. A universal coupling comprising two coupling members, means for keeping the axes of the members in intersection, a plurality of springs, each spring having a cylindrical portion at each end thereof, and a plurality of sleeves carried by the members, one for each end of each spring, each sleeve being formed with a central bore for engagement with the cylindrical portion of the spring and with a slot for passage over the body of the spring.

5. A universal coupling comprising two coupling members, means for keeping the axes of the members in intersection, and a plurality of helically-shaped springs, each spring being in the form of an open ring and having its ends terminating short of a complete circle, the ends of the springs being radially arranged and pivotally secured to the members.

In testimony whereof, I have hereunto set my hand.

HERMAN A. WEIDENBACH.